United States Patent Office 3,051,737
Patented Aug. 28, 1962

3,051,737
PREPARATION AND USE OF CATALYSTS
Eric John Gibson, Bromley, England, assignor, by mesne assignments, to Council for Scientific and Industrial Research, London, England
No Drawing. Filed July 18, 1958, Ser. No. 749,316
21 Claims. (Cl. 260—449.6)

It has been proposed to treat catalysts based on mixed iron oxide such as are used for the conversion of acetaldehyde to acetic acid with Roentgen rays. It has also been proposed to subject a catalyst for catalyzing reactions in which hydrogen under pressure takes part, as for instance the synthesis of ammonia and of compounds from hydrogen and carbon monoxide, to rays of high frequency, for instance Roentgen rays or rays from natural radioactive sources. The catalysts used in the synthesis of ammonia are generally made by melting iron oxide with a promoter usually the oxide of another metal and then reducing the oxide to bring the iron to the metallic state. In these prior proposals improved activity of the catalyst has been claimed.

In the case of irradiation of alkali-promoted iron oxide catalysts which have been subjected at least to incipient melting temperature, used in the catalytic synthesis of hydrocarbons from carbon monoxide and hydrogen (the Fischer-Tropsch process) with which catalysts the present invention is concerned, it has been found that irradiation with ionizing radiation produces a substantial and lasting improvement in activity provided the catalyst particle size is below a certain value and the present invention is based upon this surprising discovery. The improvement becomes apparent after a period of 40 to 80 hours at 280° C. under synthesis conditions.

According to the invention, an unreduced alkali-promoted iron oxide catalyst which has been subjected at least to incipient melting temperatures, for use in the catalytic synthesis of hydrocarbons from carbon monoxide and hydrogen having a particle size below $200\mu$ is subjected to ionizing radiation.

The preferred type of catalyst is one based on alkali-impregnated steel rolling-mill scale.

The preferred types of radiation are gamma rays or especially high energy electrons, a dose of at least $1 \times 10^3$ roentgens should be given and since very powerful sources of radiation are available the dosage may be increased accordingly beyond this figure so as to ensure a dosage well above the minimum which is necessary to attain the desired effects. A very suitable figure is $1 \times 10^5$ roentgens, though there is no difficulty for example in giving a dose of from .1 to $3 \times 10^7$ roentgens with a tolerance of ±20 percent of gamma rays derived from cobalt 60 having energies of 1.17 and 1.33 mev. If such a source effects irradiation at a rate of $2 \pm 10^3$ roentgens per minute the above dose can be given in from 83 to 250 hours. Again electrons having an energy of 16 mev. may be used to effect irradiation at a rate of $1.3 \times 10^6$ roentgens per minute so that a suitable total dose of $10^7 \pm 20$ percent roentgens can be given in less than 10 minutes.

The particle size may be as much below $200\mu$ as may be desirable or suitable having regard to the use of the catalyst. Thus when the reaction is carried out in a fluidized system the particle size may be from 100 to $200\mu$ but if it is carried out in a slurry system i.e. one in which the catalyst is suspended in a high boiling fraction of the synthesis product, a much smaller particle size must be used, a suitable size being below $5\mu$. In either case the Fischer-Tropsch synthesis may be carried out under a pressure of 5 to 50 atmospheres at a temperature of 250–350° C. and with gases containing hydrogen and carbon monoxide in any volume ratio greater than 1:2.

The atmosphere in which the irradiation of the catalyst is effected is not critical but should be one which will not damage the catalyst under the conditions of irradiation. It may be an inert gas such as nitrogen, or it may be one of the gases which takes part in the reaction for which the catalyst is used, such as carbon monoxide. Again it may be oxygen. Tests show that other conditions being equal, the same improvement in activity is obtained with nitrogen and carbon monoxide and a slightly greater improvement with oxygen. As well as nitrogen or oxygen, air may be used. The atmosphere used may be at substantially normal pressure (760 mm.) or it may be less.

When brought into use, the activity of the catalyst treated in accordance with the invention is low, but rises and passes through a maximum after a period measured in hours or perhaps a few days and then slowly declines. A catalyst so treated is not substantially more active than an untreated catalyst when first put into use and the activity rises in a similar manner to that of the untreated catalyst but it rises to a substantially higher maximum, the difference from the untreated catalyst being maintained for a period of at least 300 hours.

The following are details of results obtained by the use of the invention. In all cases the catalyst was prepared by impregnating steel rolling-mill scale with potassium carbonate and calcining for four hours at 1000 to 1300° C.

The tests were carried out in 3 ways: in a fixed bed system, in a fluidized system and in a slurry system. For the tests the catalyst treated with gamma rays and the catalyst treated with high energy electrons were used. The gas in each case was water gas with the volume composition 45 percent CO, 49 percent $H_2$, 3 percent $CO_2$, 3 percent $N_2$. Although pressures of 5-50 atmospheres can be used for the Fischer-Tropsch synthesis the tests were carried out at 10 and 20 atmospheres. Test details are given in the following table:

| Test conditions | Fluidized system | | Slurry system | | | Fixed bed system | |
|---|---|---|---|---|---|---|---|
| Pressure, atmospheres | 10 | | 20 | | | 20 | |
| Temperature, ° C | 280 | | 285 | | | 285 | |
| Gas velocity, litres per gram iron per hour | 0.580 | 0.588 | 3.28 | 3.43 | 3.5 | 1.85 | 1.75 |
| Duration, hours | 200 | 160 | 190 | 180 | 180 | 300 | 300 |
| Weight of catalyst, grams | 40 | | 50 | | | 60 | |
| Particle size | 100–200$\mu$ | | less than 5$\mu$ | | | 400–600$\mu$ | |
| Type of radiation | | (1) | | (1) | (2) | | (1) |
| Dose, Roentgens $\times 10^7$ | Nil | 3.62 | Nil | 3.35 | 1 | Nil | 4.8 |
| Conversion litres (CO+$H_2$) per gram iron per hour | 0.254 | 0.314 | 1.12 | 1.8 | 2.2 | 1.05 | 1.00 |

[1] Gamma rays.
[2] High energy electrons.

It will be seen that with a fluidized bed system using a catalyst of particle size 100–200$\mu$ irradiated with gamma rays the conversion increased by 23 percent over that obtained using an intreated catalyst of similar particle size. With a slurry system using a catalyst of particle size 5$\mu$ or less irradiated with gamma rays the conversion increased by 60 percent over that obtained with an untreated catalyst of similar particle size, and using a catalyst of similar particle size but irradiated with high energy electrons the conversion increased by 100 percent. With a fixed bed system using a catalyst of particle size 400–600$\mu$ irriadiated with gamma rays there was no increase in conversion over that obtained with an untreated catalyst of similar particle size.

What I claim is:

1. A method of increasing the activity of a solid unreduced alkali-promoted iron oxide catalyst which has been subjected at least to incipient melting temperature, for use in the catalytic synthesis of hydrocarbons from carbon monoxide and hydrogen comprising subjecting said catalyst in the form of particles below 200μ in size to ionizing radiation.

2. A method according to claim 1 in which the dose of ionizing radiation is at least $1 \times 10^3$ roentgens.

3. A method according to claim 1 in which the catalyst is one based on alkali-impregnated steel rolling-mill scale.

4. A process according to claim 3 in which the catalyst is one prepared by impregnating steel rolling-mill scale with potassium carbonate and calcining for four hours at 1000 to 1300° C.

5. A method according to claim 1 in which the radiation consists of gamma rays.

6. A method according to claim 5 in which the gamma rays are derived from cobalt 60 and have energies of 1.17 and 1.33 mev.

7. A method according to claim 1 in which the radiation consists of high energy electrons.

8. A method according to claim 7 in which the electrons have an energy of about 16 mev.

9. A method according to claim 1 in which the total dose is at least $1 \times 10^5$ roentgens.

10. A method according to claim 1 in which the particle size is from 100 to 200μ.

11. A method according to claim 1 in which the particle size is at most about 5μ.

12. A method according to claim 1 in which the irradiation is effected in an atmosphere of an inert gas such as nitrogen.

13. A method according to claim 1 in which the irradiation is effected in one of the gases which takes part in the reaction for which the catalyst is used.

14. A method according to claim 1 in which the radiation is effected in an oxygen containing atmosphere.

15. A method according to claim 12 in which the atmosphere in which the irradiation is effected is at a pressure not substantially exceeding normal pressure.

16. A process for the synthesis of hydrocarbons from carbon monoxide and hydrogen in which the reaction is catalyzed by a catalyst treated by the method claimed in claim 1.

17. A process according to claim 16 in which the catalyst has a particle size from 100 to 200μ and the reaction is carried out in a fluidized system.

18. A process according to claim 16 in which the catalyst has a particle size of at most 5μ and the reaction is carried out in a slurry system.

19. A process according to claim 16, in which the reaction is carried out under a pressure of 5 to 50 atmospheres at a temperature of 250–350° C. and with a gas containing hydrogen and carbon monoxide in a volume ratio greater than 1:2.

20. A method according to claim 13 in which the atmosphere in which the irradiation is effected is at a pressure not substantially exceeding normal pressure.

21. A method according to claim 14 in which the atmosphere in which the irradiation is effected is at a pressure not substantially exceeding normal pressure.

References Cited in the file of this patent

UNITED STATES PATENTS

| | | |
|---|---|---|
| 2,485,945 | Walker | Oct. 25, 1949 |
| 2,845,414 | Schutze | July 29, 1958 |

OTHER REFERENCES

Clarke et al.: Nature, volume 180, pages 140–141, July 20, 1957.